No. 747,346. PATENTED DEC. 22, 1903.
F. ALSIP.
FURNACE.
APPLICATION FILED AUG. 9, 1902.
NO MODEL.
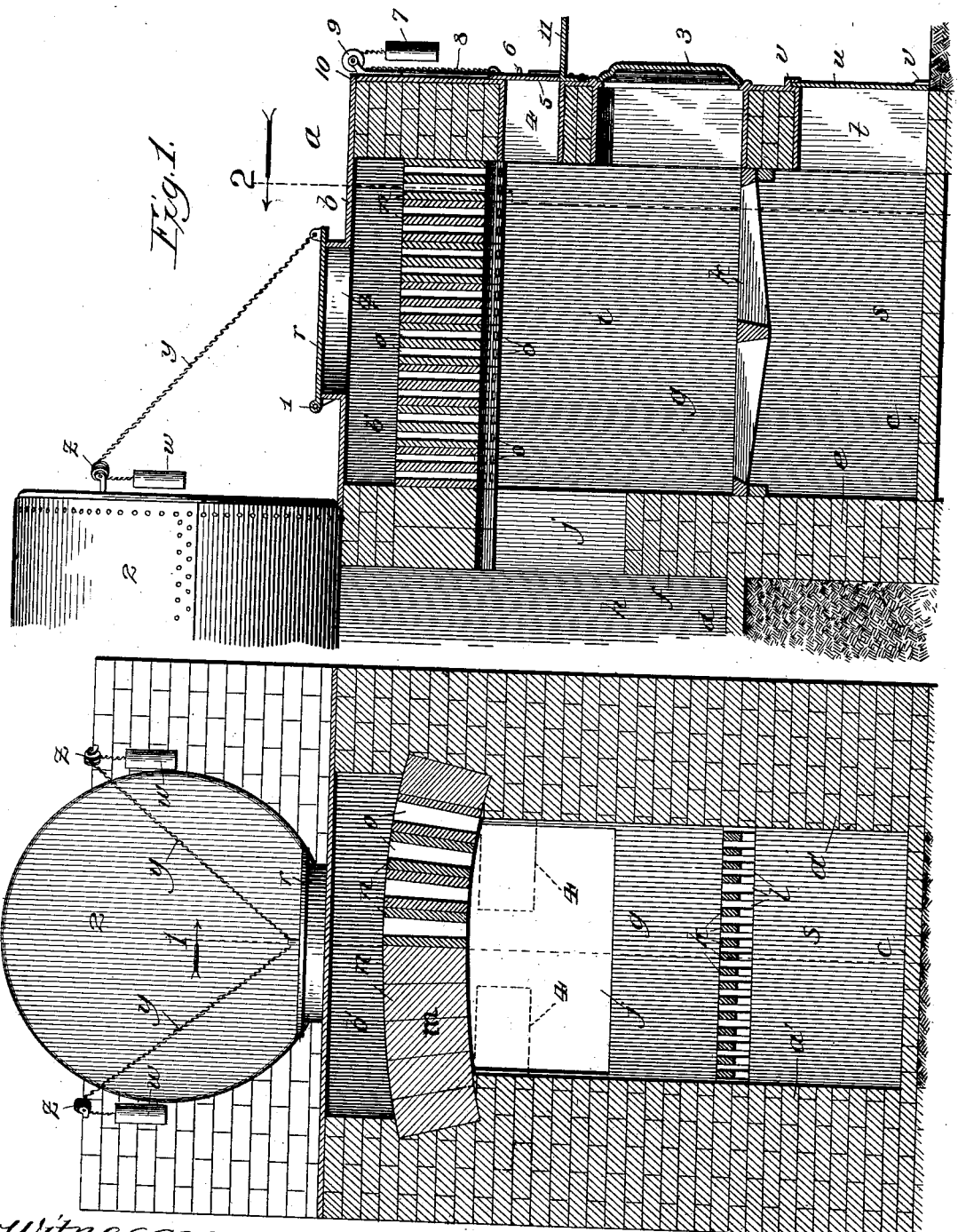
Witnesses:
Inventor:
Frank Alsip,
By Thomas F. Sheridan,
Atty.

No. 747,346. Patented December 22, 1903.

UNITED STATES PATENT OFFICE.

FRANK ALSIP, OF CHICAGO, ILLINOIS.

FURNACE.

SPECIFICATION forming part of Letters Patent No. 747,346, dated December 22, 1903.

Application filed August 9, 1902. Serial No. 118,981. (No model.)

*To all whom it may concern:*

Be it known that I, FRANK ALSIP, a citizen of the United States, residing in Chicago, county of Cook, and State of Illinois, am the inventor of certain new and useful Improvements in Furnaces, of which the following is a specification.

My invention relates to that class of furnaces having a fire-box provided with a roof having perforations extending therethrough and communicating on the inner side of such roof with the fire-box and provided with means for regulating the admission of air through the perforations in such perforated fire-box roof and means for admitting and regulating the admission of air through the grate.

It relates, further, to furnaces having the above elements in combination with an outer furnace-roof, an air-chamber formed by the fire-chamber roof and the outer furnace-roof, a main fire-box door, and a plurality of relatively small feed-doors arranged above the main fire-box door communicating with the fire-chamber and adapted to admit fuel thereto without the necessity of opening the main fire-box door.

The principal object of the invention is to provide a simple, economical, and efficient furnace having a fire-box provided with a grated bottom and a perforated roof formed of substantially fireproof material, means for regulating the admission of air through the perforations in the roof to the fire or combustion chamber, and means for regulating the admission of air to the fire-box through the openings in the grate.

A further object of the invention is to provide a furnace having an outer roof and an air-chamber thereunder, a fire-box provided with a grated bottom and having a roof formed of bricks of substantially fireproof material, each having perforations therethrough forming air-passages communicating with the fire-chamber and with the air-chamber, means for regulating the admission of air to the air-chamber and air-passages, means for regulating the admission of air through the openings in the grate, a main fire-box door, and a plurality of relatively small fuel-feeding doors for the admission of fuel without the necessity of opening the main fire-box door, whereby the desired completeness of combustion is obtained and the greatest possible economy of fuel secured.

My invention consists in a furnace having outer inclosing walls and provided with a grated fire-chamber, a roof for such fire-chamber provided with air-passages extending to and communicating therewith, means for regulating the admission of air to the fire-chamber through the perforations in the roof thereof, and means for regulating the admission of air to such chamber through the grated bottom thereof.

The invention consists, further, in the combination of a furnace having inclosing walls and an outer furnace-roof having an air-chamber thereunder, a fire-chamber having a grated bottom and a perforated roof, means for regulating the admission of air to the fire-chamber through such perforated roof, and means of regulating the admission of air thereto through the openings in the grated bottom.

The invention consists, further, in a furnace having outer inclosing walls and an outer roof and provided with a fire-box formed within such inclosing walls, having a grated bottom and a perforated fire-chamber roof arranged beneath the outer roof of the furnace and forming an air-space between it and such roof, the perforation in such fire-chamber roof forming air-passages between the air-chamber and fire-chamber, means for regulating the admission of air to such chamber, and means for regulating the admission of air through the openings in the grate to the fire-chamber.

The invention consists, further and finally, in the features, combinations, and details of construction hereinafter described and claimed.

In the accompanying drawings, Figure 1 is a longitudinal sectional view in elevation of my improved furnace, shown with a portion of a boiler; Fig. 2, a view in cross-sectional elevation taken on line 2 of Fig. 1.

In illustrating and describing my improved furnace I have shown it in connection with a boiler, which may be of any ordinary or desired type; but I do not wish to confine its application, except as set forth in the claim, with the description and drawings, and I have only illustrated and described what is new, taken with only so much of that which is old as is necessary to properly and clearly illustrate and describe my invention and its application.

In constructing a furnace in accordance with my improvements I provide a furnace $a$, having outer walls $a'$, formed, preferably, of brick or similar substantially non-combustible material, an outer roof $b$, provided with an air-chamber $b'$ thereunder, and also having a bottom or main base portion $c$ and a rearwardly-extending base portion $d$.

A rear wall $e$ extends upwardly to the rearwardly-extending base portion, and an inner wall $f$ forms a bridge or inner dividing-wall between the fire-box or fire-chamber $g$ and the heating-chamber $h$, which are united by the passage $j$ over the bridge and together form a complete combustion-chamber $i$. The heating-chamber or rear portion of the combustion-chamber is inclosed within side walls of any ordinary and well-known type and which may be a continuation of the outer walls $a'$, (shown in Fig. 2,) inclosing or partly inclosing the material to be heated.

The fire-box or front portion of the combustion-chamber is provided with a grated bottom $k$, consisting of cast-metal grates arranged side by side separate from each other in the ordinary manner, so as to afford the necessary support for the fuel and provide the necessary openings $l$ for the admission of air through the grate and through the fuel thereon to the fire-chamber.

The fire-box portion of the combustion-chamber is also provided with a roof $m$, formed, preferably, of fire-brick $n$, each having perforations $o$ therethrough communicating with the fire-chamber and forming passages for the admission of air thereto. This roof is arranged at some distance below the outer roof of the furnace, so as to provide an air-chamber $b'$, before mentioned, between such parts, and the outer roof has an opening $q$, provided with a door $r$ for the admission of air to such air-chamber and the air-passages.

The space between the grated bottom of the fire-box and the main base portion forms an ash-pit $s$, which is provided with an opening $t$, having a door $u$ for the admission and regulation of the air admitted to the fire-box through the grating thereof. The door $u$ is mounted in slides $v$ and is thus readily adjusted to admit and regulate the amount of air admitted thereby.

The door $r$ at the top of the furnace is provided with a counterweight $w$, connected thereto by means of a chain $y$, mounted upon a pulley $z$, such door being provided with hinges 1, by means of which it is swingingly connected to the outer roof of the furnace. It will be thus seen that it may be readily adjusted so as to regulate the dimensions of the air-inlet opening and the amount of air admitted therethrough to the air-chamber.

By employing the means above described to properly regulate, on one hand, the draft and the amount of air to the fire-chamber through the fuel and grate and, on the other hand, the amount of air admitted through the upper air-passages out of contact with the fuel the openings of the upper air-passages are distributed over a large area, as shown, and the air admitted is therefore distributed over a correspondingly large area within the fire-chamber and when properly proportioned with relation to that admitted through the fuel practically completes combustion and the greatest possible economy of fuel is obtained, the smoke being for all practical purposes entirely consumed.

The main fire-box door 3 is necessarily large enough to allow the grate to be cleaned and to permit the kindling of the fire and the renewal of grate-bars. It is therefore desirable that it should be kept closed while the fuel is being fed. I therefore provide relatively small fuel-inlet openings 4, each having a door 5, slidingly mounted in slides 6, so as to be readily movable up and down. A counterweight 7 is attached to each of these doors by means of a chain 8 and a pulley 9, rotatably mounted in brackets 10 above the door, and a feeding-hearth 11 is arranged at the bottom of such feed-doors extending beneath both openings and adapted to hold a supply of coal constantly before the openings and exclude the air to a great extent while the fuel is being fed. This arrangement of the feed-doors above the main fire-box door also enables the fuel to be fed well back and spread uniformly, while exposing the smallest possible opening for the admission of air. The uniform proportions of the air admitted through the grate and the fuel and, on the other hand, through the upper air-passages is thus maintained, resulting in great economy of fuel, a high degree of combustion, and practically complete consumption of smoke.

I claim—

In a furnace of the class described, the combination of inclosed walls provided with a fire-chamber, a roof for such fire-chamber consisting of bricks each having perforations therethrough communicating with such fire-chamber, a grated bottom for the fire-chamber provided with openings therethrough forming air-passages, means for regulating the admission of air to the air-passages of the roof, and means for regulating the admission of air to the air-passages of the grate, substantially as described.

FRANK ALSIP.

Witnesses:
H. I. CROMER,
J. E. RUPP.

It is hereby certified that in Letters Patent No. 747,346, granted December 22, 1903, upon the application of Frank Alsip, of Chicago, Illinois, for an improvement in "Furnaces," an error appears in the printed specification requiring correction, as follows: In line 113, page 2, the word "inclosed" should read *enclosing;* and that the said Letters Patent should be read with this correction therein that the same may conform to the record of the case in the Patent Office.

Signed and sealed this 12th day of January, A. D., 1904.

[SEAL.]

F. I. ALLEN,
*Commissioner of Patents.*